May 31, 1960  R. A. FRYKLUND  2,939,105
ECHO RANGING SYSTEM
Filed April 19, 1954  2 Sheets-Sheet 1
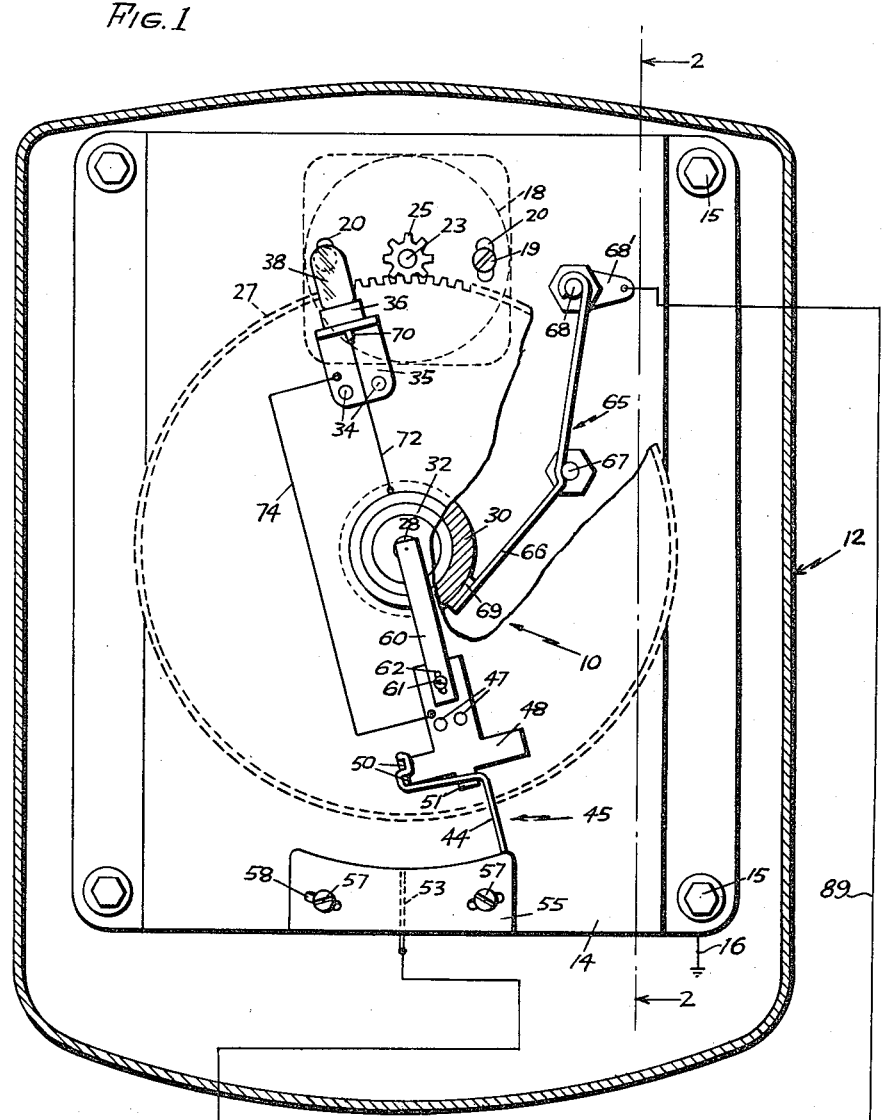
Fig. 1
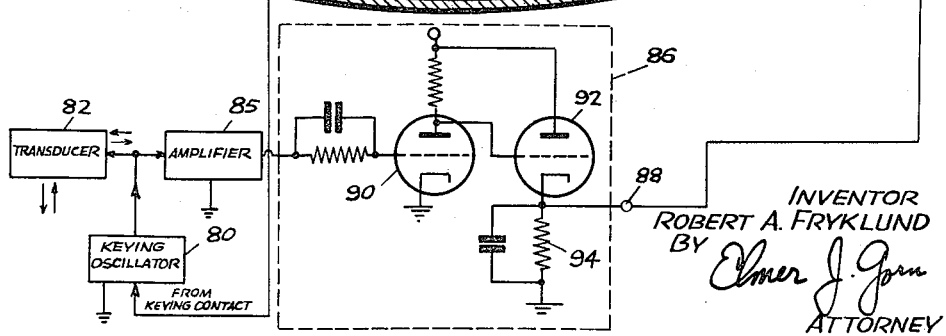
INVENTOR
ROBERT A. FRYKLUND
BY
ATTORNEY May 31, 1960

R. A. FRYKLUND 2,939,105

ECHO RANGING SYSTEM

Filed April 19, 1954

INVENTOR
ROBERT A. FRYKLUND
BY
ATTORNEY

United States Patent Office 2,939,105
Patented May 31, 1960

2,939,105

ECHO RANGING SYSTEM

Robert A. Fryklund, Dedham, Mass., assignor to Raytheon Company, a corporation of Delaware Filed Apr. 19, 1954, Ser. No. 424,154

14 Claims. (Cl. 340—1)

This invention relates to an echo depth-sounding instrument of the indicating type and more particularly relates to an improved indicator for measuring the distance between submerged bodies and an object at the surface as a function of the time interval between the transmission of a wave impulse and the receipt of a reflected impulse.

Indicating depth measuring devices, such as described in an application of R. A. Fryklund for U.S. Letters Patent, Serial No. 220,684, filed April 12, 1951, now patent No. 2,845,513, comprised generally a rotating member which carries a lamp and a keying element. Once during each revolution of the keying element past a given point a compressional wave signal is initiated and subsequently reflected from a distant object. The lamp is illuminated in response to a received signal from the distant object and the angular displacement of the spot of light showing through a transparent calibrated scale is a measure of the distance of said object from the measuring device.

In accordance with this invention, a simplified indicating mechanism is made possible by using a minimum number of parts and by constructing the various parts of the proper electrically conductive and electrically insulating material so that an electric circuit function may be combined with a mechanical function. The indicator comprises a driven electrically insulating disk, which carries the lamp and a keying contact; this disk may be a gear driven through a pinion, particularly in multiple range devices. This disk is supported on an electrically conductive hub which also serves to contain a bearing for permitting rotation of said disk about a fixed supporting spindle. The hub also serves as a slip ring against which an input brush rests. The insulating disk, in addition to carrying the lamp and a keying contact, also functions to insulate the slip ring or hub from the lamp and keyer circuitry. The keying contact may be readily grounded to the shaft.

Also in accordance with this invention, an inexpensive low-power indicating lamp may be used which is receptive of a unidirectional signal from a detector circuit rather than an alternating current signal as in prior depth-sounding devices. When an alternating current signal is applied to the lamp, first one electrode and then the other become surrounded with a visible glow. Since the electrodes are in substantial alignment, the electrode nearest the indicator dial remains dark during half of each cycle. The total luminous flux, integrated over a period of time, is consequently reduced.

If a unidirectional voltage is applied to the tube, however, one electrode remains cold and the other is continuously surrounded with a visible glow. By orienting the tube so that the glowing electrode is the one nearer the indicator dial, the total luminous flux, integrated over an interval of time, is substantially increased. In some cases the glass wall of the dial is coated with an opaque substance except for a narrow slit; in such cases the above effect is even more pronounced.

The detector is coupled to a cathode follower stage which is normally conductive in the absence of an input signal. If the lamp is connected in the cathode follower output circuit, a bias may be maintained on the lamp which is only slightly below the striking potential of the lamp. In this manner a comparatively small input signal is required to cause the lamp to glow and inexpensive low-power lamps may be utilized.

In the drawing:

Fig. 1 is a view illustrating a portion of an indicator embodying this invention in elevation, and including a diagram of the external electric circuit used with the indicator;

Figure 2:
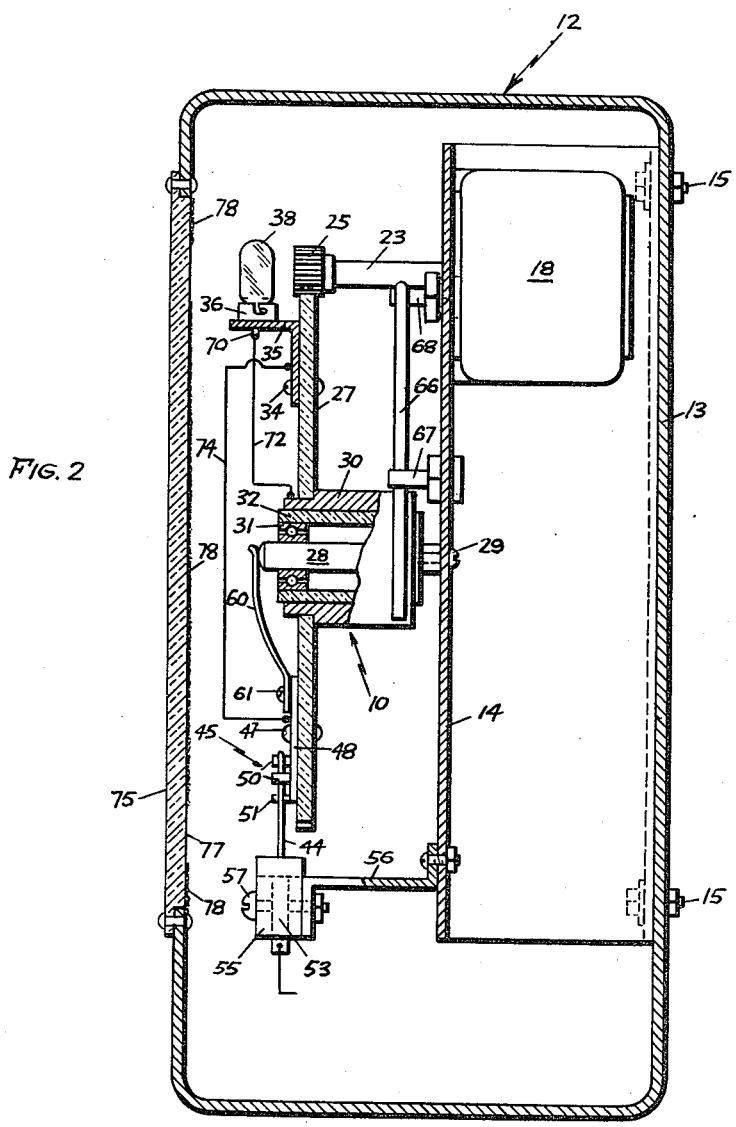
Fig. 2 is a sectional view, partly in elevation, of the device of Fig. 1 taken along line 2—2 of Fig. 1.

Referring now to Figs. 1 and 2, there is shown an indicator assembly 10 housed in a case 12. A U-shaped channel or mounting bracket 14 is supported relative to the rear wall 13 of indicator case 12 by means of bolts 15 or other appropriate fastening devices. Alternatively, bracket 14 may be fastened to a chassis plate which, in turn, is attached to the case 12. The indicator case 12 may be electrically connected to ground, as by ground connection 16 attached to bracket 14. A motor 18 is attached to bracket 14 by bolts 19 passing through slotted holes 20 in bracket 14. Motor 18 may be any constant speed motor such as a synchronous motor. The shaft 23 of motor 18 extends through an aperture in bracket 14. Mounted on one end of shaft 23 is a pinion gear 25 which is in operative engagement with an indicator disk or gear 27. These gears are constructed of an electrically insulating material such as phenolic for reasons which later will be apparent. If other than gear drive is used, as, for example, peripheral drives such as used in certain phonograph turntables, the disk 27 may have smooth edges. An electrically conductive spindle 28 is attached to bracket 14 as by mounting screw 29. Disk 27 is attached, as by a press fit, to a metallic hub 30 which is electrically insulated from spindle 28 and bearings 31 by an electrically insulating sleeve 32. Hub 30, including sleeve 32, is rotatably mounted on spindle 28 by means of the aforesaid bearings 31. Although ball bearings are shown in Fig. 2, a tubular bushing my be used in lieu thereof.

Attached near the periphery of disk 27 as by rivets 34 is a bracket 35, one end of which carries a socket 36 into which an indicating electron discharge device such as neon lamp 38 may be inserted. This neon lamp may be a low-power neon tube having a single contact bayonet base and including a pair of spaced, longitudinally-disposed rod electrodes 40 and 41, as shown clearly in Fig. 3. The neon lamp 38 is not limited to a bayonet type and any one of several gaseous glow discharge lamps may be used provided a proper connection is made to bracket 35.

A movable keying contact 44 comprising a flat springy member and forming part of a keying assembly 45 is attached to the lower end of a metallic bracket 48 secured as by rivets 47 to the face of disk 27. Keying assembly 45 is mounted on disk 27 substantially diametrically opposite lamp 38, although considerable latitude in the position of mounting keying assembly 45 is permissible. One end of contact 44 is bent, as shown in Fig. 1, to engage a pair of supporting fingers 50 struck up from an enlarged portion of bracket 48 so that the lower end of the contact is biased radially outward. Outward motion of contact 44 is limited by a stop 51 struck up from bracket 48.

The stationary contact 53 of keying assembly 45 consists of a flat metallic strip in axial alignment with movable contact 44 and imbedded in a keying block 55 of insulating material. Keying block 55 is fastened to a bracket 56, connected to mounting bracket 14, by holding screws 57 which pass through slotted holes 58 in block 55 to allow for slight adjustment of keying block 55 so that the "zero" flash of the lamp is lined up with zero on the dial. One end of stationary contact 53 is disposed flush with the curved upper surface of block 55 while the other end extends below the block and is available as an input terminal for the external keying circuitry whose function will be clearly described subsequently. An electrically conductive grounding brush 60, which may be a curved springy strip of Phosphor bronze or stainless steel, is adjustably mounted on the upper end of bracket 48 by a screw 61 passing through slotted hole 62 in said brush. Brush 60 resiliently engages the free end of spindle 28 and should be adjusted so that its contact face rests squarely on the end of said spindle.

Keying contact 44 and grounding contact 60 may be attached to separate brackets on disk 27, in which case the two contacts could be interconnected by a flexible circuit lead. By mounting the keying contact 44 and grounding contact 60 to disk 27 by a common bracket, however, as shown in Figs. 1 and 2, a more simplified construction is attained inasmuch as one terminal, one mounting screw and a circuit lead may be eliminated.

The indicating light circuit includes an indicator brush assembly 65 comprising an indicator brush 66 and a pair of studs 67 and 68. A lug 68' is attached to stud 68 and serves as an input terminal which may be connected to the detector output terminal 88. The brush 66 consists of a flat strip of resilient metal having one end curved about stud 68, an intermediate portion engaging stud 67 and the other end resiliently engaging the periphery of hub 30. The brush is arranged to snap in place against studs 67 and 68 in such a manner that the brush is biased in firm contact with the hub. To provide a better contact with the hub, the end of brush 66 engaging the hub may contain a proper graphite insert 69.

One electrode of lamp 38 is in contact with a centrally positioned socket terminal 70, while the other electrode is in contact with the outer case of the socket 36 which is in mechanical and electrical contact with indicator mounting bracket 35. Bracket 35 may, of course, be an integral part of the socket assembly. Socket terminal 70 is connected to the edge of hub 30 by means of a flexible lead 72, while a similar flexible lead 74 serves to interconnect the indicator mounting bracket 35 and bracket 48, or either the keying assembly 45 or grounding contact 60, in the event that separately mounted keying and grounding contacts are used.

An indicator dial 75, a portion of which is shown in Fig. 2, is mounted in front of disk 27 and may form either a front portion of case 12 or a portion of a front cover which may be secured to the case, as shown in detail in the aforesaid pending application. Dial 75 comprises a circular glass plate which, except for a narrow annular portion or slit 77, is rendered opaque to light, as by painting with a layer of black paint 78.

The instrument scale comprises a series of index markings, not shown, marked over the portion of dial 75 adjacent transparent slit 77. The flashes of light from lamp 38 show through the transparent slit 77 in dial 75 and are visible to an operator. At each revolution of disk 27 movable contact 44 passes over stationary contact 53 in keying block 55 and closes a keying circuit 80, shown in Fig. 1, thus permitting electrical impulses to be supplied to a compressional wave transducer 82 which converts the electrical impulses into compressional waves directed toward the object whose distance is to be measured, such as a school of fish, or the bottom of a river. At the same time, keyer 80 supplies electrical impulses to an amplifier 85 and a detector 86 similar to that shown and described in an application of R. A. Fryklund for U.S. Letters Patent, Serial No. 350,788, filed April 24, 1953, now Patent No. 2,869,109.

Detector 86 includes a triode grid leak detector stage 90, whose output or plate circuit is connected to the grid of a cathode follower stage 92. The lamp 38 is connected across cathode resistor 94 of stage 92. The circuit values of the cathode follower are such that it is normally conductive in the absence of an input signal and a bias voltage is supplied to the lamp 38 which is slightly below the firing voltage of the lamp. For example, if a 90-volt lamp were used, the bias voltage appearing across cathode resistor 94 may be of the order of from 50 to 80 volts. Because of this steady voltage across lamp 38, a comparatively small additional voltage is required to effect firing. Less amplification of the input signal is thereby required and a small low-power, inexpensive neon lamp may be used. For example, a miniature neon lamp rated at $\frac{1}{25}$ watt and 0.5 milliampere has been found to provide adequate illumination without necessitating excessive pre-amplification of the input signal.

The detected output at terminal 88 is applied to lamp 38 through an electrically conductive path including lead 89, input terminal 68 attached to lug 68', indicator brush 66, hub 30, lead 72, inner terminal 70 of neon lamp 38, the outer terminal of lamp 38 (socket 36), bracket 35, lead 74, grounding contact 60 and grounded spindle 28. The neon lamp 38 thus flashes during the initiation of a transmitted impulse and serves as a zero-indication.

The returning echoes from the aforesaid object are picked up by transducer 82 and converted back into electrical pulses which are fed to amplifier 85. The amplified received pulses are converted into unidirectional signals by detector 86. These unidirectional signals are then applied to terminal 88 and thence to neon lamp 38 by the above-mentioned electrically conductive path.

Although one side of the electric circuit is indicated as grounded, it is possible to operate with one side of the circuit at a reference potential rather than ground. In this event, a ground connection 16 and the ground connections on keying oscillator 80 and amplifier 85 would be replaced by a conductor interconnecting case 12 to both keying oscillator 80 and amplifier 85, respectively.

By proper adjustment of keying block 55, the movable keying contact 44 is so positioned relative to the stationary keying contact 53 that the initial pulse is transmitted at the instant that lamp 38 is opposite the zero point on the dial 75. Since disk 27 continues to rotate at a constant speed, lamp 38 is carried to a new position annularly displaced from the zero position when the echo pulse lights it. The distance traversed by the echo pulse is obtained by observing the index marking, not shown, opposite the second flash of the lamp 38.

Figure 3:
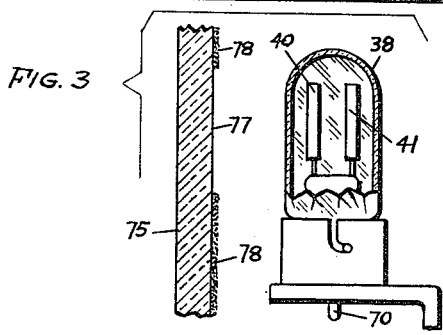
Fig. 3 is a detailed view showing the position of the indicator lamp with respect to the indicator dial.

As is well known in the art, when a voltage of sufficient magnitude is impressed across a lamp or other similar gaseous discharge device, the gas ionizes and current flows through the tube. This is accompanied by a visible discharge which occurs as a glow covering part or all of the cathode or negative electrode of the tube. If a unidirectional signal is applied to lamp 38, only one electrode of the tube will be surrounded by a glow. If the tube is so positioned with respect to the dial that the glowing electrode is behind the dark electrode, the latter obscures a substantial portion of the light visible to an observer located in front of the dial and reading of the indicator is extremely difficult, especially under conditions of relatively high ambient light intensity. By orienting the lamp so that the glowing electrode 40 of Fig. 3 is in front of the dark electrode 41, that is, on the side toward the observer, measurement of the distance of an object is greatly facilitated. Since the relative position of the neon lamp electrodes 40 and 41 with respect to the socket pin does not vary appreciably in commercially available tubes, positioning of the glowing electrodes 40 a minimum distance from the dial may usually be accompanied permanently by an initial orientation of the socket, if one is used, and by inserting the tube in the proper direction in the socket. If necessary, owing to replacement of tubes, the socket, if one is used, may be reoriented slightly as required.

If a change in the distance measuring range of the indicator is desired, it is necessary only to change the pinion gear and either to replace the dial or to provide a plurality of scales on a single dial. When changing pinion gears it is necessary to readjust the mesh of the two gears 25 and 27 by loosening the motor screws 19 in slotted holes 20 and moving the motor 18 up or down. The mesh should be so adjusted that the teeth fully engage, but the pinion gear 25 should not press on gear 27 lest undue wear occur. The proper adjustment of the mesh of the two gears also allows for minimizing the noise produced by the open spur gears. As previously stated this invention is applicable to any indicating devices regardless of the method of producing rotation of disk 27.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. An indicating device comprising a stationary spindle at least a portion of which is electrically conductive, a rotatable member consisting of an electrically insulated element and an electrically conductive hub insulatedly mounted on said spindle, drive means mechanically connected to said element for producing rotation of said member, an indicating electron discharge device mounted on said element and providing a visual indication when receptive of input signals, a switch including a rotatable switch contact and a stationary switch contact, said rotatable switch contact mounted on said element and contacting said stationary switch contact once during each revolution of said member, one end of said rotatable switch contact resiliently engaging said spindle, an input terminal, a current carrying means having one end resiliently engaging said hub and the other end connected to said input terminal, and means for electrically connecting said electron discharge device to said hub.

2. An indicating device comprising a stationary electrically conductive spindle, a rotatable member consisting of an electrically insulated element and an electrically conductive hub insulatedly mounted on said spindle, drive means mechanically connected to said element for producing rotation of said member, an indicating electron discharge device mounted on said element and providing a visual indication when receptive of input signals, a switch including a rotatable switch contact and a stationary switch contact, said rotatable switch contact mounted on said element and contacting said stationary switch contact once during each revolution of said member, a ground contact element having one end electrically connected to said rotatable switch contact and the other end resiliently engaging said spindle, an input terminal, a current carrying means having one end resiliently engaging said hub and the other end connected to said input terminal, and means for electrically connecting said electron discharge device to said hub and ground contact element, respectively.

3. An indicating device comprising a stationary electrically conductive spindle attached at one end to a mounting plate, an electrically insulating sleeve rotatably mounted on said spindle, an electrically conductive hub affixed to said sleeve, an electrically insulating gear wheel attached to said hub, a pinion gear mechanically coupled to said gear wheel, a calibrated indicator dial containing a transparent annular slit, an indicating electron discharge device mounted on said wheel opposite and behind said slit and including a pair of electrodes, a switch contact mounted on said wheel and connected at one end to said spindle, an input terminal, an electrically conductive brush having one end resiliently engaging said hub and the other end connected to said input terminal, said electrodes of said electron discharge device being electrically connected to said switch contact and said hub, respectively, and drive means connected to said pinion gear for producing rotation of said electron discharge device and said switch contact with respect to said dial.

4. An indicating device comprising a stationary electrically conductive spindle attached at one end to a mounting plate, an electrically insulating sleeve rotatably mounted on said spindle, an electrically conductive hub affixed to said sleeve, an electrically insulating gear wheel attached to said hub, a pinion gear mechanically coupled to said gear wheel, a calibrated indicator dial containing a transparent annular slit, an indicating electron discharge device mounted on the said wheel and arranged to cast a beam of light upon said slit, said electron discharge device including a pair of electrodes, a grounding element resiliently engaging one end of said spindle and attached to said wheel, a switch contact mounted on said gear wheel and connected at one end to said grounding element, an input terminal, an electrically conductive brush having one end resiliently engaging said hub and the other end connected to said input terminal, said electrodes being electrically connected to said grounding element and said hub, respectively, and drive means connected to said pinion gear for producing rotation of said electron discharge device and said switch contact with respect to said dial.

5. An indicating device for indicating the presence of input signals comprising a stationary electrically conductive spindle maintained at a fixed reference potential, an electrically insulating member rotatably mounted on said spindle and including an electrically conductive hub electrically insulated from said spindle, drive means mechanically connected to said member for producing rotation of said member, an indicating electron discharge device supported on said member and providing a visual indication when receptive of an input signal, said electron discharge device including a pair of electrodes connected, respectively, to said hub and to a region maintained at said reference potential, means including a switch contact mounted on said member and electrically connected to said region of fixed reference potential for initiating a control function once during each revolution of said member, and means including a current carrying member resiliently engaging said hub for supplying available input signals to said electron discharge device.

6. An indicating device for indicating the presence of input signals comprising a stationary electrically conductive spindle maintained at ground potential, an electrically insulating member rotatably mounted on said spindle and including an electrically conductive hub electrically insulated from said spindle, drive means mechanically connected to said member for producing rotation of said member, an indicating electron discharge device mounted on said member and adapted to provide a visual indication when receptive of an input signal, said electron discharge device including a pair of elements connected, respectively, to said hub and to said grounded spindle, means including a switch contact mounted on said member substantially diametrically opposite said electron discharge device and electrically connected to said spindle for initiating a control function once during each revolution of said member, and means including a current carrying member resiliently engaging said hub for supplying available input signals to said electron discharge device.

7. An indicating device for indicating the presence of unidirectional input signals comprising a stationary electrically conductive spindle maintained at a fixed reference potential, an electrically insulating member rotatably mounted on said spindle and including an electrically conductive hub electrically insulated from said spindle, drive means mechanically connected to said member for producing rotation of said member, an indicating electron discharge device supported on said member, said electron discharge device including a pair of electrodes connected, respectively, to said hub and to a region maintained at said reference potential, means including a switch contact mounted on said member and electrically connected to said region of fixed reference potential for initiating the generation and transmission of oscillatory energy, once during each revolution of said member, a detector having at least a plate and a grid, said detector being receptive of a portion of said oscillatory energy for altering the plate voltage of said detector, a cathode follower coupled to said detector and productive of a unidirectional voltage whose magnitude is dependent upon the plate voltage of said detector, and means including a current carrying member resiliently engaging said hub for supplying available unidirectional voltage to said electron discharge device, one only of said electrodes being surrounded by a visible glow when receptive of said unidirectional voltage, said one electrode being positioned further from said member than the other of said electrodes.

8. An indicating device for indicating the presence of unidirectional input signals comprising a stationary electrically conductive spindle maintained at a fixed reference potential, an electrically insulating member rotatably mounted on said spindle and including an electrically conductive hub electrically insulated from said spindle, drive means mechanically connected to said member for producing rotation of said member, an indicating electron discharge device supported on said member and including a pair of electrodes connected, respectively, to said hub and to a region maintained at said reference potential, means including a switch contact mounted on said member and electrically connected to said region of fixed reference potential for initiating the generation and transmission of oscillatory energy, once during each revolution of said member, a detector having at least a plate and a grid, said detector being receptive of a portion of said oscillatory energy for increasing the plate voltage of said detector, a cathode follower coupled to said detector and productive of a bias voltage in the absence of reception of said oscillatory energy which is slightly below the ignition voltage of said electron discharge device, said cathode follower being productive of a unidirectional voltage which exceeds the ignition voltage thereof during reception of said oscillatory energy, and means including a current carrying member resiliently engaging said hub for supplying available unidirectional input signals to said electron discharge device, said one electrode being positioned further from said member than the other of said electrodes.

9. In an indicating device for measuring distance by the time interval between the transmission of a signal and the reception of an acho signal, a stationary electrically conductive spindle maintained at a fixed reference potential, an electrically conductive hub rotatably mounted on said spindle and electrically insulated therefrom, an electrically insulated member affixed to said hub, a calibrated indicator dial containing a transparent annular portion, drive means for producing continuous rotation of said member relative to said dial, an indicating electron discharge device mounted on said member opposite and behind said transparent portion of said dial and including a pair of electrodes, a movable switch contact mounted on said member and resiliently contacting said spindle for initiating a control function once during each revolution of said member, a signal input terminal, a current carrying element having one end resiliently engaging said hub and connected to said input terminal, and means for electrically connecting said electrodes to said hub and to said switch contact, respectively.

10. In an indicating device for measuring distance by the time interval between the transmission of a signal and the reception of an echo signal, means for receiving an echo signal, means for converting said echo signal into a unidirectional signal, said means for converting including a detector and a cathode follower coupled to said detector, a stationary electrically conductive spindle maintained at a fixed reference potential and attached at one end to a mounting plate, an electrically conductive hub rotatably mounted on said spindle and electrically insulated therefrom, an electrically insulated member affixed to said hub, a calibrated indicator dial containing a transparent annular portion, drive means for producing continuous rotation of said member relative to said dial, an indicating electron discharge device mounted on said member opposite and behind said transparent portion of said dial and having a pair of electrodes one only of which is surrounded by a visible glow during application to said electron discharge device of said unidirectional signal, a movable switch contact mounted on said member and resiliently contacting said spindle for initiating a control function once during each revolution of said member, a current carrying element having one end resiliently engaging said hub and receptive of said unidirectional signals, means for electrically connecting said electrodes to said hub and to said switch contact, respectively, and means responsive to receipt of said unidirectional signal for producing a visible glow about the electrode nearer said dial.

11. In an indicating device for measuring distance by the time interval between the transmission of a signal and the reception of an echo signal, means for receiving an echo signal, means for converting said echo signal into a unidirectional signal, said means for converting including a detector and a cathode follower coupled to said detector, a stationary electrically conductive spindle maintained at a fixed reference potential and attached at one end to a mounting plate, an electrically conductive hub rotatably mounted on said spindle and electrically insulated therefrom, an electrically insulated member affixed to said hub, a calibrated indicator dial containing a transparent annular portion, drive means for producing continuous rotation of said member relative to said dial, an indicating electron discharge device normally biased slightly below the striking potential, said electron discharge device being mounted on said member opposite and behind said transparent portion of said dial and having a pair of electrodes one of which is disposed nearer said dial then the other electrode, the electrode nearer said dial being surrounded by a visible glow during application to said electron discharge device of said unidirectional signal, a movable switch contact mounted on said member and resiliently contacting said spindle for initiating a control function once during each revolution of said member, a current carrying element having one end resiliently engaging said hub and receptive of said unidirectional signals, means for electrically connecting said electrodes to said hub and to said switch contact, respectively.

12. In an indicating device for measuring distance by the time interval between the transmission of a signal and the reception of an echo signal, a stationary electrically conductive spindle maintained at a fixed reference potential, an electrically conductive hub rotatably mounted on said spindle and electrically insulated therefrom, an electrically insulated member affixed to said hub, a calibrated indicator dial containing a transparent annular portion, drive means for producing continuous rotation of said member relative to said dial, an indicating electron discharge device mounted on said member opposite and behind said transparent portion and having a pair of electrodes, a movable switch contact mounted on said member and resiliently contacting said spindle for initiating a control function once during each revolution of said member, a current carrying element having one end resiliently engaging said hub and capable of passing said echo signals, and means for electrically connecting said electrodes to said hub and to said switch contact, respectively.

13. In an indicating device for measuring distances by the time interval between the transmission of a signal and the receipt of an echo signal, means for detecting said echo signal, a cathode follower coupled to said means for detecting for deriving a direct current voltage, a stationary indicator dial, an electron discharge device energized by said direct current voltage and positioned behind said dial, said device including a pair of electrodes one only of which is surrounded by a visible glow during application of said direct current voltage to said electron discharge device, means for producing rotation of said electron discharge device behind said dial, said one electrode being positioned nearer said dial than the other of said electrodes.

14. An echo-sounding system comprising a stationary member having an electrically-conductive generally cylindrical surface, an electrically nonconductive rotatable member arranged for rotation about the axis of said surface, an electrically-conductive slip ring coaxial with said surface and insulated therefrom and mounted to rotate together with said rotating member, an electric lamp and a first switch contact element mounted on said rotatable member so that each travels in a prescribed path as said member is rotated, a brush member, one terminal of said lamp being electrically connected to said slip ring and the other terminal being electrically connected to said surface by way of said brush member, a stationary switch contact element positioned in the path of said first contact element and engaged thereby during revolution of the rotatable member, circuit means actuated in response to engaging of said contact elements for effecting transmission of a signal toward an object, a stationary current-carrying element slidably engaging said slip ring, and an input terminal receptive of energy reflected from said object, said input terminal being interconnected with said lamp by way of said current-carrying element, said slip ring, said brush member and said surface.

References Cited in the file of this patent

UNITED STATES PATENTS

| | | |
|---|---|---|
| 1,667,540 | Dorsey | Apr. 24, 1928 |
| 1,680,507 | Dorsey | Aug. 14, 1928 |
| 1,972,889 | Hayes | Sept. 11, 1934 |
| 2,157,856 | Koch | May 9, 1939 |
| 2,410,065 | Harrison | Oct. 29, 1946 |
| 2,465,990 | Anderson | Apr. 5, 1949 |
| 2,497,675 | Kornei | Feb. 14, 1950 |
| 2,714,136 | Greenwood | July 26, 1955 |
| 2,767,385 | Smith | Oct. 16, 1956 |

FOREIGN PATENTS

| | | |
|---|---|---|
| 647,297 | Germany | July 1, 1937 |
| 663,533 | Germany | Aug. 8, 1938 |
| 886,870 | Germany | Aug. 17, 1953 |